US009225525B2

(12) United States Patent
Fu et al.

(10) Patent No.: US 9,225,525 B2
(45) Date of Patent: Dec. 29, 2015

(54) IDENTITY MANAGEMENT CERTIFICATE OPERATIONS

(75) Inventors: Christina Fu, Saratoga, CA (US);
Andrew Wnuk, San Jose, CA (US)

(73) Assignee: Red Hat, Inc., Raleigh, NC (US)

( * ) Notice: Subject to any disclaimer, the term of this patent is extended or adjusted under 35 U.S.C. 154(b) by 979 days.

(21) Appl. No.: 12/714,108

(22) Filed: Feb. 26, 2010

(65) Prior Publication Data

US 2011/0213965 A1 Sep. 1, 2011

(51) Int. Cl.
| | |
|---|---|
| *H04L 29/06* | (2006.01) |
| *H04L 9/32* | (2006.01) |
| *H04L 9/06* | (2006.01) |
| *G06F 15/16* | (2006.01) |
| *H04L 29/12* | (2006.01) |

(52) U.S. Cl.
CPC ............ *H04L 9/3213* (2013.01); *H04L 9/3268* (2013.01); *H04L 63/0823* (2013.01); *H04L 63/104* (2013.01); *H04L 63/20* (2013.01); *H04L 61/1505* (2013.01); *H04L 63/0807* (2013.01); *H04L 2209/76* (2013.01); *H04L 2209/80* (2013.01)

(58) Field of Classification Search
CPC . H04L 63/0823; H04L 9/3263; H04L 9/3268; H04L 9/321; G06F 21/64; G06F 2221/2113
USPC ............................ 380/279, 30, 282; 709/248; 713/156–158, 168, 175; 726/10, 18, 2
See application file for complete search history.

(56) References Cited

U.S. PATENT DOCUMENTS

| | | | |
|---|---|---|---|
| 6,233,341 B1 | 5/2001 | Riggins | |
| 7,325,140 B2 * | 1/2008 | Carley | 713/182 |
| 7,356,601 B1 * | 4/2008 | Clymer et al. | 709/229 |
| 7,591,012 B2 | 9/2009 | Jaganathan et al. | |
| 7,600,123 B2 * | 10/2009 | Parupudi et al. | 713/175 |
| 7,627,896 B2 * | 12/2009 | Herrmann | 726/14 |
| 7,644,275 B2 * | 1/2010 | Mowers et al. | 713/168 |
| 7,703,128 B2 | 4/2010 | Cross et al. | |
| 7,761,910 B2 | 7/2010 | Ransom et al. | |
| 7,937,583 B2 * | 5/2011 | Thornton et al. | 713/156 |
| 7,975,139 B2 | 7/2011 | Couler | |
| 8,010,786 B1 * | 8/2011 | Ward | 713/156 |
| 8,068,612 B2 * | 11/2011 | Appenzeller et al. | 380/282 |
| 8,087,075 B2 * | 12/2011 | Peterson et al. | 726/10 |
| 8,095,788 B2 * | 1/2012 | Vilhuber et al. | 713/156 |
| 8,100,323 B1 | 1/2012 | Crews et al. | |
| 2006/0143442 A1 * | 6/2006 | Smith | 713/156 |
| 2009/0031410 A1 * | 1/2009 | Schneider et al. | 726/10 |
| 2010/0299517 A1 | 11/2010 | Jukic et al. | |

OTHER PUBLICATIONS

Du, Liping et al., "A CSK based SSL handshake protocol," Network Infrastructure and Digital Content, 2009. IC-NIDC 2009. IEEE International Conference on , vol., no., pp. 600,603, Nov. 6-8, 2009; doi: 10.1109/ICNIDC.2009.5360980; http://ieeexplore.ieee.org/stamp/stamp.jsp?tp=&arnumber=5360980&isnumber=5360780.*
David O'Brien, freeIPA 1.2.1, "Administration Reference, IPA Solutions from the IPA Experts," May 13, 2009, 34 pages.
Non-Final Office Action for U.S. Appl. No. 12/714,227 mailed Apr. 12, 2012.
USPTO Final Office Action for U.S. Appl. No. 12/714,227 mailed May 21, 2013, 21 pages.

* cited by examiner

*Primary Examiner* — Michael Chao
*Assistant Examiner* — Feliciano Mejia
(74) *Attorney, Agent, or Firm* — Lowenstein Sandler LLP

(57) ABSTRACT

A method and system for identity management certificate operations is described.

18 Claims, 8 Drawing Sheets

IDENTITY MANAGEMENT CERTIFICATE OPERATIONS

RELATED APPLICATIONS

This application is related to co-pending U.S. application Ser. No. 12/714,227, entitled "Automatically Generating a Certificate Operation Request," filed Feb. 26, 2010, which is incorporated herein by reference.

TECHNICAL FIELD

Embodiments of the invention relate to the field of identity management systems, and more particularly, to an identity management system configured to perform certificate operations on behalf of a client without user intervention at the client.

BACKGROUND

Identity management systems are information systems that support the management of identities. In particular, an identity management system establishes the identity of a subject or an object by linking a name (or number) with the subject or object. The identity management system may also describe the identity, for example, by assigning one or more attributes applicable to the particular subject or object to the identity. The identity management system may also modify the identity, such as by linking a new or additional name, or number, with the subject or object and/or change one or more attributes applicable to the particular subject or object. The identity management system can record and/or provide access to logs of activity by the identity.

One of the cornerstones of establishing a secure network environment is making sure that access is restricted to people who have the right to access the network. This access is allowed when the user can authenticate to the identity management system, meaning the user can verify his identity. Typically, the identity management system provides a single point of management, a single source for identities, single sign-on or single password, and a single data store. Single sign-on is a configuration which allows administrators to create a single password store so that users can log in once, using a single password, and be authenticated against all network resources. Single sign-on is both a convenience to users and another layer of security for the server and the network. Single sign-on hinges on secure and effective authentication.

The authentication of the identity management system may be managed by a public key infrastructure (PKI), such as implemented by a certificate system. For PKI, users and machines may present digital certificates to verify their identity. A digital signature is a mathematical representation of a message, using public key cryptography, which identifies the originator of the message, in a non-forgeable manner. Public key cryptography requires the use of two mathematically related keys—a public key and a private key (collectively referred to as a key pair). The private key is kept private by a single owner, and is not distributed to anyone else. The owner uses his or her private key, in conjunction with cryptographic algorithms, to digitally sign a message. The public key is made public, and can be used by anyone to verify the digital signature on a message. The fact that these two keys are mathematically related ensures that only a single private key can generate a digital signature that is verifiable by the corresponding public key, making the digital signature unforgeable. A digital certificate, commonly referred to as a certificate, is an electronic document used to identify an individual, a server, a company, or another type of entity and to associate that identity with a public key. The digital certificate binds a person's identity to his or her public key, and consequently, to his or her private key, and may be used to verify digital signatures. Digital certificates and digital signatures then provide the foundation for secure transactions over a network, such as the Internet.

Certificate authorities (CAs) validate identities and issue certificates. CAs can be either independent third parties or organizations running their own certificate-issuing server software, such as a certificate system. Before issuing a certificate, a CA must confirm the user's identity with its standard verification procedures. The certificate issued by the CA binds a particular public key to the name of the entity identified by the certificate. In addition to the public key, the certificates include the name of the entity it identifies, an expiration date, and the name of the CA that issued the certificate.

The authentication identity management system may also be managed by Kerberos authentication. Kerberos authentication is an authentication system that uses a computer network authentication protocol, which allows nodes communicating over a non-secure network to prove their identity to one another in a secure manner. Kerberos authentication builds on symmetric key cryptography and requires a trusted third party.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
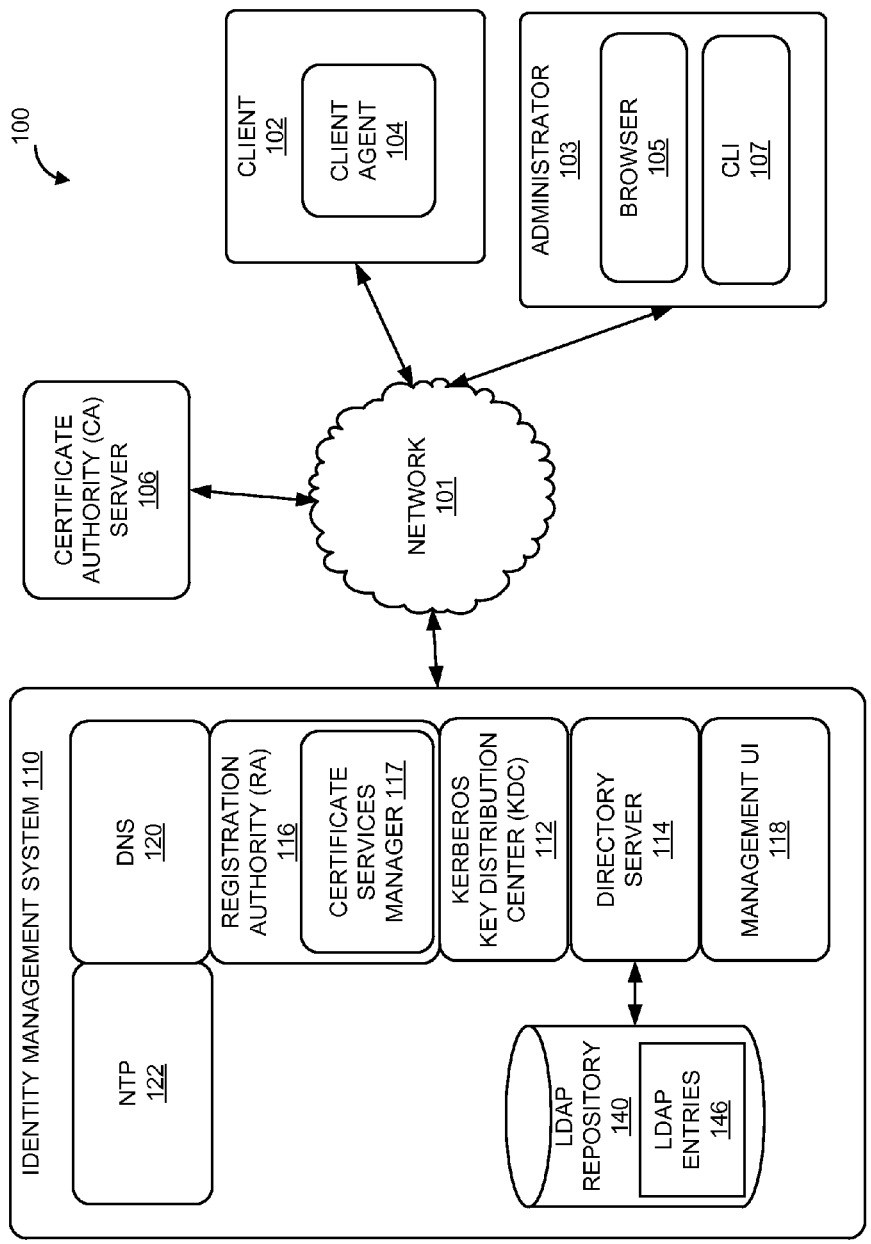
FIG. 1 is a block diagram of exemplary system architecture in which embodiments of an identity management system, having a certificate services manager, may operate.

A method and system for identity management certificate operations is described. In one embodiment, a server establishes a secure connection with a client agent, operating on a client computing system, using an authentication protocol that uses symmetric-key cryptography. Then an identity management system of the server receives a request from the client agent over the secure connection to perform a certificate operation associated with a certificate, determines whether to approve the request received from the client agent, and sends the request to a certificate authority (CA) server to perform the certificate operation when approved. The client agent is capable of requesting the certificate operation without user intervention and/or user interaction at the client computing system, and the identity management system is a trusted manager of the CA. By way of example and not limitation, the certificate operations may include requesting certificates, checking status of certificate requests, retrieving certificates, putting certificates on hold, removing certificates from being on hold, and revoking certificates. These certificate operations may be performed by the CA. To prevent direct access to the CA by the client computing system, a registration authority (RA) of the identity management system operates as a front-end of the CA, wherein the RA is a trusted manager of the CA. The RA may be embedded into an XML-RPC back end as a plug-in of the identity management system, for example. The RA will be responsible for validating the permission of the client, sending a proxy of the client's request to the CA, collecting the response from the CA, and sending the response back to the client computing system.

Embodiments of the present invention provide an improved identity management system. By integrating the RA into the identity management server that uses Kerberos authentication to establish a secure connection with a client computing system, the RA can bootstrap the authentication for PKI from the Kerberos authentication established between the identity management server and the client computing system. Since the RA is a trusted manager of the CA and since the identity management system has authenticated the client, the certificate operation requests received by the RA over the secure Kerberos connection can be performed by the CA without PKI authentication of the certificate operation requests. The Kerberos authentication provides a single sign-on authentication and allows users to carry on their identity while they access various services, including the certificate operations described herein using the embedded RA. One use case of integrating the RA into the identity management system is provisioning certificates for use by server applications, for example, applications run on web servers or IMAP servers. Alternatively, the identity management system may be configured to provision user certificates. Also, a client agent, operating on a client computing system, can automatically, and without user intervention, generate and send requests for certificate operations over the secure connection to the RA. Since the RA is a trusted manager of the CA server and the client computing system has been authenticated using Kerberos, the identity management server can allow the certificate operations to be performed transparently to the user of the client computing system.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "establishing," "receiving," "sending," "approving," "authenticating," "processing," "computing," "calculating," "determining," "displaying," or the like, refer to the actions and processes of a computer system, or similar electronic computing systems, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system specifically programmed by a computer program stored in the computer system. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 is a block diagram of exemplary system architecture 100 in which embodiments of an identity management system 110, having a certificate services manager 117, may operate. The architecture 100 includes a client workstation 102, an administrator workstation 103, the identity management system 110, and a certificate authority (CA) server 106, each coupled to the network 101 that communicates any of the standard protocols for the exchange of information. The network 101 may be a Local Area Network (LAN) and may be incorporated into the same physical or logical system, or different physical or logical systems. Alternatively, the client 102, administrator 103, identity management system 110, and CA 106 may reside on different LANs that may be coupled together via the Internet (e.g., network 101), but separated by firewalls, routers, and/or other network devices. Alternatively, the network 101 may represent other types of public or private networks or any combination thereof, such as an intranet, an extranet, a cellular network, the Internet, or any combination thereof. The network connections may be LAN connections, Internet connections, Wi-Fi connections, 3G connections, or the like, and may use various types of protocols to communicate data to and from the respective devices.

The identity management system 110 may be implemented using one or more server computers, gateways or other computing systems. In one embodiment, the identity management system 110 resides on an identity server (also referred to as an identity, policy, audit (IPA) server). The identity server is a server that manages identities of users, services, applications, hosts, or the like, and an IPA server is a server that manages not only identities, but also policies and audits. Alternatively, other types of servers may be used to implement the identity management system 110. In the depicted embodiment, the identity management system 110 includes a Kerberos key distribution center (KDC) 112, a directory server 114, a registration authority (RA) 116, which includes the certificate services manager 117, a management user interface 118, a network time protocol (NTP) server 122, and a domain name system (DNS) server 120.

In one embodiment, the identity management system 110 provides a single point of management, a single source for identities, single-sign-on or single-password, and a single data store. In one embodiment, the identity management system 110 manages the identities of principals on the network, such as users, hosts, applications, services or the like. The term "principal" refers to a user or service that can authenticate using Kerberos. In one embodiment, the single data store is implemented as a Lightweight Directory Access Protocol (LDAP) repository 140 having LDAP entries 146 that store records associated with the users, hosts, services, and/or applications that access the identity management system 110. The Kerberos KDC 112 and RA 116 can access the LDAP entries 146 via the directory server 114. The directory server 114 manages the LDAP entries 146 in a hierarchical manner using directories. These directories can store a variety of information and can enable access to the information from any machine on the LDAP-enabled network. The LDAP directory stores identity information in an extensible way. The LDAP directory also performs access control at the attribute level, allows identities to be organized, and allows group relationships. The LDAP directory also allows the information to be distributed across the enterprise and to be replicated on multiple servers. Alternatively, other types of data stores may be used, as well as other database technologies other than LDAP.

In one embodiment, the LDAP repository 140 stores the LDAP entries 146 in a directory tree that is split into several sub-trees, including, for example, a Kerberos sub-tree, an accounts sub-tree, and a miscellaneous sub-tree. The Kerberos sub-tree (e.g., cn=Kerberos) stores most of the Kerberos related information, except for the user principals. The accounts sub-tree (e.g., cn=accounts) stores identity groups, services, and related information. The miscellaneous sub-tree (e.g., cn=etc) stores configuration or system related data.

The client 102 and administrator 103 workstations may each be a personal computer (PC), such as a laptop or desktop computer, a tablet PC, a set-top box (STB), a gaming system, a portable electronic device, such as a mobile phone, personal digital assistant (PDA), wireless terminal, portable gaming system, or another wireless electronic device. In one embodiment, the client 102 is a service provider that provides a service to one or more clients over a network, such as, for example, a web server, a wiki server, an email server (e.g., IMAP server), or the like. It should be noted that various other network configurations can be used including, for example, hosted configuration, distributed configurations, centralized configurations, etc.

In the depicted embodiment, the client 102 includes a client agent 104 that communicates with the identity management system 110 over the network 101. The client agent 104 may be configured to perform various operations, including network configuration functions, authentication functions, authorization functions, operations related to establishing the secure connection with the identity management system 110, as well as certificate operations. Various certificate operations are described herein. In one embodiment, the client agent 104 is integrated as part of a system security services daemon (SSSD). The SSSD is a collection of different services and daemons running in the system context that handle the operations described above. In one embodiment, the SSSD is configured to manage certificates, such as requesting and retrieving certificates. In one embodiment, the client agent 104 generates requests for the certificate operations and sends the requests to the identity management system 110 without user intervention at the client 102. In one embodiment, the SSSD manages certificates in a manner that is transparent to the user. The client 102 can use the certificates for applications operating on the client 102, such as for signing, encryption, and/or other cryptographic functions. For example, when a web server needs a signing certificate, the client agent may automatically, and without user intervention, generate a certificate-signing request (CSR) and send the CSR to the RA 116 of the identity management system 110. The RA 116 determines whether to approve the request, such as by validating the permissions of the client 102, and sends the request to the CA server 106 when approved. When the RA 116 receives the signing certificate, the identity management system 110 delivers the signing certificate to the client 102 in a manner that is transparent to the user.

The client 102 communicates with the identity management system 110 securely using an authentication protocol that uses symmetric-key cryptography, such as Kerberos authentication protocol. In the depicted embodiment, the identity management system 110 includes a Kerberos key distribution center (KDC) 112 to establish the secure connection using Kerberos authentication protocol. The Kerberos KDC 112 is described below with respect to FIG. 2B. As described above, using the Kerberos authentication established between the identity management system 110 and the client 102, the RA 116 can bootstrap the PKI authentication for certificate requests from the Kerberos authentication as described herein.

When the client agent 104 sends a request over the secure connection to perform a certificate operation to the identity management system 110, instead of sending the request directly to the CA server 106, the client agent 104 sends the request to the RA 116. The RA 116 is responsible for validating the permission of the client 102, and proxying the client's request to the CA server 106, collecting the response from the CA server 106, and sending the response back to the client 102. Since the RA 116 is a trusted manager of the CA server 106, the certificate operation requests received from the RA 116 on behalf of the client 102 can be performed by the CA 106 without PKI authentication for the certificate operation requests because the CA 106 receives the certificate operation requests from the RA 106, which is a trusted manager, which receives the requests over the secure connection established by the Kerberos authentication. In one embodiment, the RA 116 is embedded into the identity management system 110 as an XML-RPC back-end plug-in, for example. Alternatively, the RA 116 may be implemented in the identity management system 110 in other configurations as would be appreciated by one of ordinary skill in the art having the benefit of this disclosure.

Certificate authorities (CAs) validate identities and issue certificates. CAs can be either independent third parties or organizations running their own certificate-issuing server software, such as a certificate system running on the CA server 106. The CA can issue, renew, revoke, and publish a wide variety of certificates, for servers, for users, for routers, for other subsystems, and for file or object signing. The CA can be implemented as software, hardware, firmware or any combination of the above. In one embodiment, the CA server 106 is the core of a CA's PKI. The PKI is a set of hardware, software, people, policies, and procedures needed to create, manage, distribute, use, renew, and revoke digital certificates. The CA server 106 can also compile and publish certificate revocation lists (CRLs). The CA server 106 can establish and maintain relationships with the identity management system 110 to receive requests for certificate operations, such as CSRs. In one embodiment, the CA server 106 includes an online certificate status responder (OSCP) that can verify whether a certificate is valid, on hold, revoked, or the like. In one embodiment, the CA server 106 issues a certificate (e.g., SSL client certificate) to the identity management system 110, allowing the identity management system 110 to be a trusted subsystem of the CA server 106. Since the identity management system 110 is a trusted subsystem of the CA server 106, the requests received from the identity management system 110 do not need to be authenticated by the CA server 106.

The administrator workstation 103 includes a management user interface (UI) 118 for management of the certificates. In one embodiment, a user of the workstation 103 (administrator) can access the management UI 118 via a browser 105, in which case the UI is a web-based browser. In this embodiment, the administrator can access the management UI 118 via a command line interface (CLI) 107. The administrator can perform various tasks via either management interface, such as listing the certificate issued to a host (e.g., >ipa-certs list --host=my.host.somewhere.com), check the status of a certificate (e.g., >ipa-certs revoke --serial=<serial number>), revoking a certificate (e.g., >ipa-certs revoke --serial=<serial number>), renewing a certificate (e.g., >ipa-certs renew --serial=<serial number>), or the like.

It should be noted that in these embodiments, the administrator, via the management UI 118, initiates the certificate operations. In those scenarios the administrator is the actor and his/her access control properties are checked before a certificate operation is granted. Potentially an administrator, depending upon his privileges of cause, can perform all the certificate operations including issuance, renewal and revocation. Any of these operations is manual and requires user authentication before it can be performed. In the embodiments described herein, the client agent 104 (e.g., host) initiates the certificate operations, instead of a user (i.e., administrator). For example, a host that is a client to the identity management system 110 runs a web application that needs a certificate for the web application to function. In one embodiment, the client agent 104 can request certificates. If a new certificate needs to be issued, the client agent 104 can request a new certificate from the identity management system 110. This assumes that the keypair is generated on the client 102, and the client 102 is submitting a public key to the CA 106 via the RA 116. Alternatively, a key escrow may be used in the case of server-side key generation. In different situations the certificate issuance can be delayed pending administrative approval. In another embodiment, the client agent 104 can track and check the status of outstanding requests. In another embodiment, the client agent 104 can retrieve the certificates. For example, when the request is approved, the client agent 104 can retrieve the certificate and store it in the appropriate location. In another embodiment, the client agent 104 can revoke a certificate. For example, if the certificate is lost or compromised, the client agent 104 can revoke the certificate so that it cannot be used any more. The client agent 104 may also not completely revoke the certificate, but put the certificate on hold, for example, until the next day. The client agent 104 may also take a certificate off of hold. For another example, the host (i.e., host services provided by the client 102) could renew certificates on behalf of the application if it detects that the certificate is about to expire. In one embodiment, some limitations may be put on what a host can request, for example, the host may request only certificates for itself (or a service running on the same host), and not for any other host, or the host may not revoke certificates in cases where there would be irreparable impact on the customer environment.

In these embodiments, the certificates may be associated with the hosts, as opposed to user certificates. If there are multiple services running on the same host, there might be a need to issue multiple certificates. There may be several approaches to address how this can be done. In one embodiment, the certificate services manager 117 allows multiple certificates to be issued for one host by allowing the CA to publish the issued certificates into the multi-valued attribute in the host entry. In another embodiment, the certificate services manager 117 allows child entries under host entries where the multiple certificates will be stored. This way there will be no problems with publishing and un-publishing the certificates, but the child entries under host entries introduce branches to an otherwise flat tree. In another embodiment, the certificate services manager 117 allows the certificates to be put in the service entry, such as in an auxiliary class. Conceptually, service entries are used to store Kerberos principal keys, and the certificate services manager 117 may store the certificate attributes to the service entry using the auxiliary class. In another embodiment, the certificate may not be published at all, and for any administrative needs, the identity management system 110 can query the CA 106 using the RA 116. Alternatively, other approaches or any combination of the above approaches may be used. For example, if one certificate per host entry is allowed, and if more certificates are needed, the certificates can be issued to the services running on the host. In this case, the service could be modified to be a sub-tree for the Kerberos data and the certificate. The Kerberos KDC 112 stores all Kerberos principals, including expiration information and other principals related information, as well as realm related configuration information.

When using Kerberos authentication, time synchronization is important since the directory server 114 and the Kerberos KDC 112 may rely on synchronized clocks on all machines joined to the realm of the identity management system 110 (also referred to as the IPA realm). For example, the Kerberos libraries and KDC allow for a maximum of five minutes clock slew between machines for security reasons. The realm is a network that uses Kerberos authentication, including one or more KDCs and a potentially large number of clients, such as client 102. Time synchronization is also needed to create certificate and other validity/expiration dates correctly. In one embodiment, the identity management system 110 includes the NTP server 122 to synchronize clocks of the identity management server 100 and the client 102. Additional details regarding the operations of the NTP server 122 have not been provided as these details would be appreciated by one of ordinary skill in the art having the benefit of this disclosure. Alternatively, other clock synchronization programs can be used in the network.

In one embodiment, the identity management system 110 includes the DNS server 120 to allow easier configuration of the clients. The DNS server 120 is used to provide basic information about the Kerberos realm. Also, in order to retrieve tickets to access remote machines, the clients need to be able to resolve machine names. Also, because some services might provide only a network address (e.g., IP address) to the Kerberos libraries, the DNS 120 can be used for forward and inverse resolution. In one embodiment, the DNS server 120 is configured to resolve a machine name of the client 102 or to inversely resolve a network address of the client 102. In one embodiment, the DNS server 120 is configured to resolve a machine name of the identity management system 110 or to inversely resolve a network address of the identity management system 110 for the client 102.

Figure 2A:
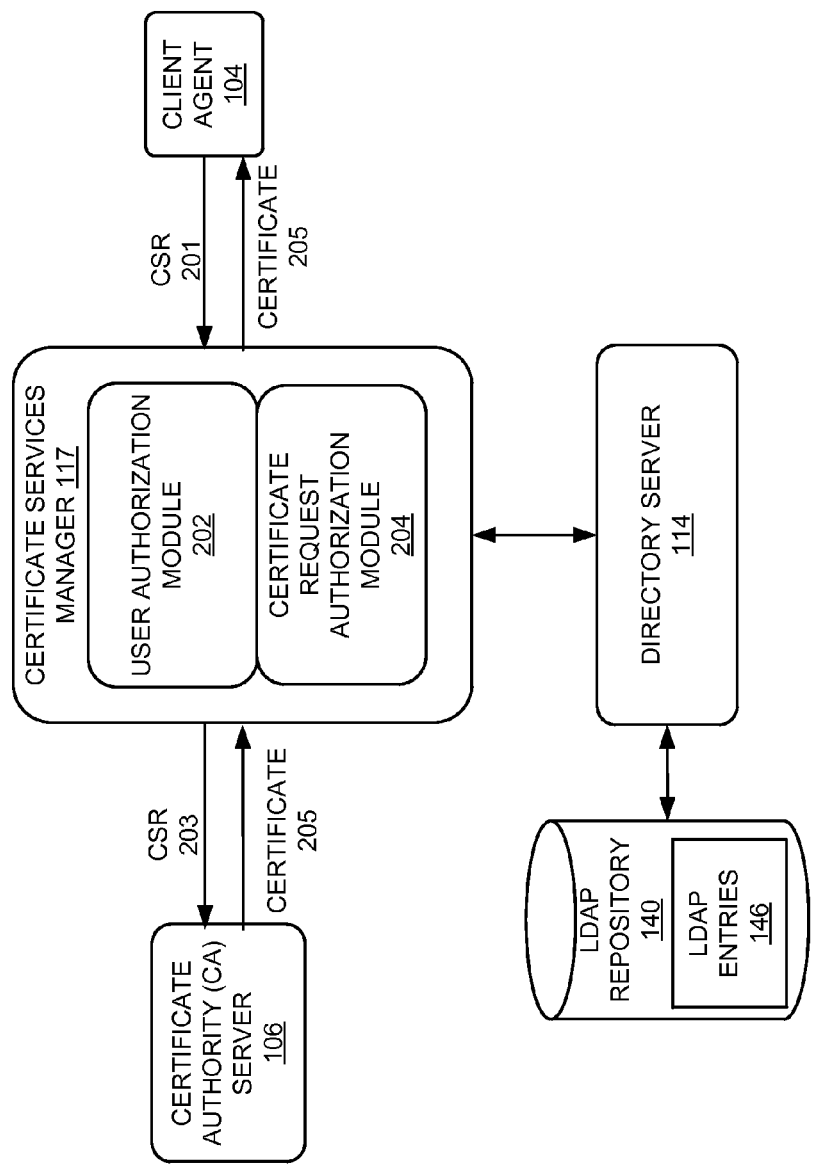
FIG. 2A is a block diagram of one embodiment of the certificate services manager of FIG. 1.

FIG. 2A is a block diagram of one embodiment of the certificate services manager 117 of FIG. 1. The certificate services manager 117 includes a user authorization module 202 and a certificate request authorization module 204. The following embodiment describes how the certificate services manager 117 receives a certificate-signing request (CSR) 201 from the client agent 104 to request a new certificate for a service provided by the client 102. In one embodiment, the CSR 201 contains information identifying an owner of the certificate and a public key. The CSR 201 is digitally signed by a private key. Alternatively, the CSR 201 can contain additional information and may not be digitally signed. The certificate services manager 117 receives the CSR 201 from the client agent 104. One embodiment of CSR generation by the client agent 104 is described in greater detail below with respect to FIG. 2C.

Upon receiving the CSR 201, the certificate services manager 117 determines whether to approve the CSR 201, and upon approval, sends the CSR 203 (which may be the same as CSR 201, a proxy of the CSR 201 or may be a new CSR that has been modified by the certificate services manager 117) to the CA server 106. When the CA server 106 approves the request, the CA server 106 sends the certificate 205 back to the certificate services manager 117, and the certificate services manager 117 sends the certificate 205 back to the client agent 104 to be stored in the appropriate location on the client 102.

In one embodiment, the certificate services manager 117 determines whether to approve the CSR 201 using the user authorization module 202 and the certificate request authorization module 204. The user authorization module 202 determines if the client has permission to request certificates, and the certificate request authorization module 204 determines if a hostname of the client matches a subject name of the certificate. For example, in one embodiment, the certificate services manager 117 sends the CSR 203 to the CA server 106 to approve and issue the certificate 205 when the hostname and the subject name match and when the client has permission to request certificates. The certificate request authorization module 204 compares the subject of the certificate to the hostname in the requested principal (e.g., service requesting the certificate) and determines whether these match. As described herein, because the RA 116 is a trusted manager of the CA server 106, the CSR 203 does not have to be authenticated by the CA server 106.

In one embodiment, the certificate request authorization module 204 can have granular access over individual operations. In another embodiment, the certificate request authorization module 204 can control access by groups. For example, the certificate services manager 117 can check to see if that requesting user is a member of a specific group. If the requesting user is a member of the specific group, the certificate request authorization module 204 allows the user to request any of the certificate related operations. This group, which may be labeled as an administrator group may be modified to add or remove users.

In one embodiment, the user authorization module 202 determines if the client has permission to request certificates by checking an access control instruction (ACI) stored in the LDAP repository 140. The ACI is an access rule that specifies how subjects requesting access are to be identified or what rights are allowed or denied for a particular subject. In one embodiment, the user authorization module 202 checks the request certificate ACI to see if the requester has permission to request certificates. The ACI may be stored as part of an access control list (ACL), which is a collection of access control entries that define a hierarchy of access rules to be evaluated when a server receives a request for access to a particular resource. In this case, the user authorization module 202 can evaluate the rules of the ACL to determine whether the client has the appropriate permissions to request new certificates. Alternatively, the user authorization module 202 can evaluate the rules of the ACL to determine permissions for other certificate operations.

As described above, in one embodiment, the certificate request authorization module 204 determines if the hostname of the client matches a subject name of the certificate. In another embodiment, the certificate authorization module 204 also retrieves a service principal record (e.g., LDAP entry 146) associated with a service, operating on the client 102, that is requesting the certificate from the LDAP repository 140. The certificate authorization module 204 determines if the service principal already has a user certificate attribute. The certificate services manager 117 sends the CSR 203 to the CA server 106 to approve and issue the certificate 205 when the service principle record does not already have the user certificate attribute. Conversely, the certificate request authorization module 204 stops the request when the service record associated with the CSR already has the user certificate attribute. In another embodiment, if the service principle record associated with the CSR does not exist, the certificate request authorization module 204 determines if an "add" argument is received in connection with the CSR 201. The "add" argument requests permission to modify the user certificate attribute as part of the request (e.g., $ ipa certificate-request --principal=ldap2/zeus.example.com --add). If the certificate request authorization module 204 determines that the --add argument was not provided, then the certificate request authorization module 204 stops the CSR 201. However, if the --add argument is included, the user authorization module 202 (or alternatively module 204) determines if the client has permission to modify the user certificate attribute of the service principal record. The client has permission to modify the user certificate attribute when the client is listed in the service principal record, such as in managedBy attribute, which is a multi-valued attribute that contains the distinguished name of all hosts that are allowed to write the userCertificate attribute of this service. The service-add-host and service-remove-host functions can be used to control access. In this embodiment, the certificate services manager 117 stops the request when the add argument is not received in connection with the CSR 201 or when the client 102 does not have permissions to modify the user certificate attribute, and allows the CSR 203 to be sent to the CA server 106 when the add argument is received in connection with the CSR 201 and the client 102 has permission to modify the user certificate attribute.

The embodiments described above have been illustrated with respect to the certificate operation of requesting a new certificate. However, the certificate services manager 117 may use the user authorization module 202 to determine whether the requesting host (e.g., user, service, or the like on the client 102) has permission to request the particular certificate operation, and the certificate request authorization module 204 may be used to determine whether the request should be authorized, such as whether renewal is permitted, retrieval is permitted, etc. For example, in one embodiment, the certificate services manager 117 receives a request to retrieve a certificate (e.g., revoked certificate), and the user authorization module 202 determines if a hostname of the client 102 (i.e., requested principal) matches a subject name of the certificate being requested. The certificate services manager 117 delivers the requested certificate to the client agent 104 when the hostname and the subject name match. In one embodiment, the certificate services manager 117 delivers the requested certificate transparently to the client 102, meaning without user intervention at the client 102. In another embodiment, when the certificate services manager 117 receives a request to retrieve a certificate, the certificate services manager 117 determines if the client 102 has permission to retrieve the certificate. In this embodiment, the certificate services manager 117 delivers the requested certificate to the client agent 104 when the client 102 has permission and the hostname and the subject name match. Alternatively, the certificate services manager 117 may use other conditions to verify requests from the client agent 104.

Figure 2B:
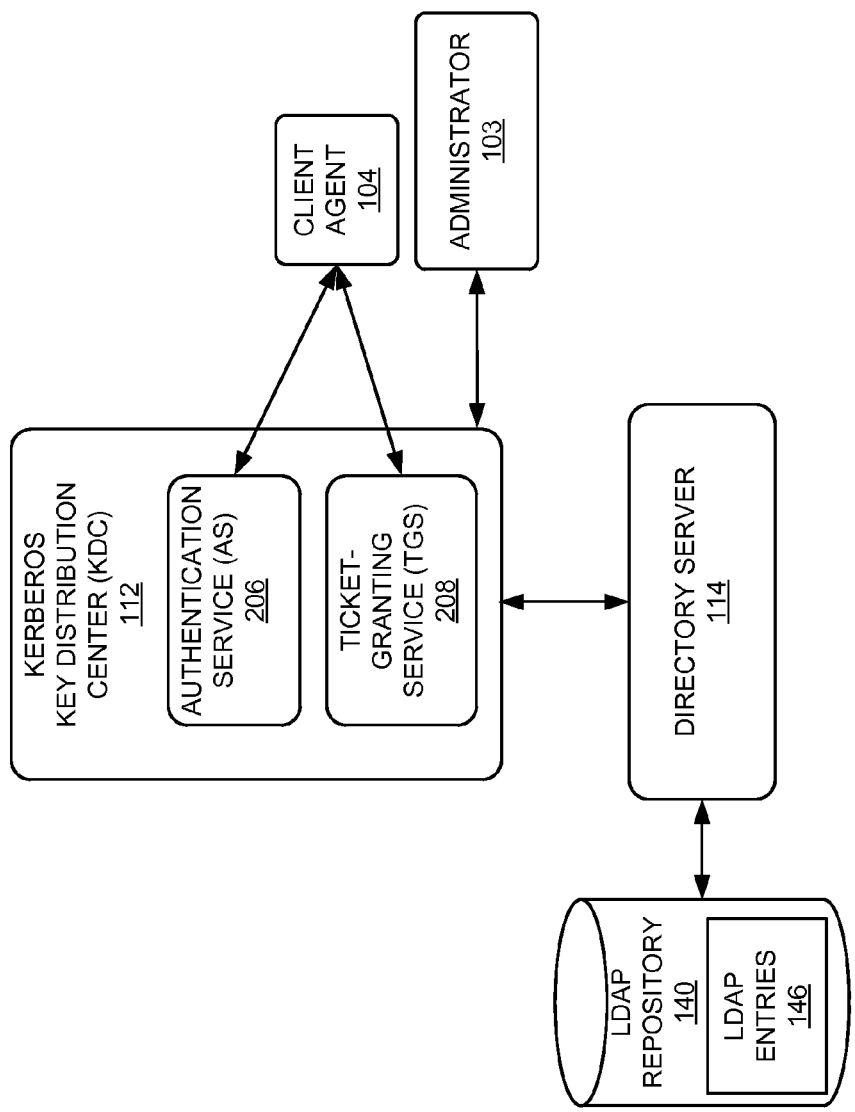
FIG. 2B is a block diagram of one embodiment of the Kerberos key distribution center (KDC) of FIG. 1.

FIG. 2B is a block diagram of one embodiment of the Kerberos KDC 112 of FIG. 1. Kerberos operates by encrypting data with a symmetric key. A symmetric key is a type of authentication where both the client and server agree to use a single encryption/decryption key for sending and/or receiving data.

On a non-kerberized network, when a user requests a network service that requires authentication, the user is prompted to type in their password. The password is then transmitted in clear-text or as a crypt hash over the network to allow access to the service. Unfortunately, this means that anyone intercepting packets on the network can potentially find out the username and password of users on the network. Kerberos deal with this threat by using symmetric encryption and a trusted third party—known as the Key Distribution Center or KDC 112—to authenticate users on a network to services on a network. The KDC 112 includes an authentication service (AS) 206 and a ticket-granting service (TGS) 208. The AS 206 receives the request by the client agent 104 and verifies that the client agent 104 is indeed the computer it claims to be. This may be done using a database lookup of the user's identifier. Upon verification, the ticket-granting service 208 creates and stores a user session using a current time (e.g., timestamp) and an expiration date, for example, eight hours, and creates an encryption key. The Kerberos KDC 112 stores the ticket specific to that session on the user's machine and any service using Kerberos authentication looks for this ticket rather than asking the user to authenticate using a password. The ticket-granting service 208 is a service that issues tickets for a desired service, which are in turn given to users for access to the service. The TGS 208 may run on the same server as the KDC 112. The ticket-granting service 208 sends the encryption key back to the client agent 104 in the form of a ticket-granting ticket (TGT). A ticket is a temporary set of electronic credentials that verify the identity of a client for a particular service, and a ticket-granting ticket is a special ticket that allows the client agent 104 to obtain additional tickets without applying for them from the KDC 112. When a user on a kerberized network logs in to their workstation, their principal is sent to the Key Distribution Center 112 as a request for a Ticket Granting Ticket (TGT). This request can be sent by the login program so that it is transparent to the user or can be sent by the kinit program after the user logs in. The KDC 112 checks for the principal in its database (e.g., LDAP repository 140). If the principal is found, the KDC 112 creates a TGT, encrypts the TGT using the user's key and sends it back to the user. The login program or kinit decrypts the TGT using the user's key (which it computes from the user's password). The TGT is set to expire after a certain period of time and stored in the client machine's credentials cache. The expiration time is set so a compromised TGT can only be used for a certain period of time (usually eight hours). This is safer than traditional password model because a compromised password can be used until it is changed. Once the TGT is issued, the user will not have to re-enter their password to the KDC 112 until the TGT expires or they logout and login again.

When the user needs access to a network service, the client agent 104 uses the TGT to request a ticket for the service from the TGS 208, which runs on the KDC 112. The TGS 208 issues a ticket for the desired service, which is then used to authenticate the user.

The Kerberos authentication mechanism allows authenticating different kinds of principals: users, host, services, etc. A client is an entity on the network, such as a user, a host, or an application that can get a ticket from the KDC 112. A principal is a user or service that can authenticate using Kerberos. A principal's name is in the form root [/instance] @REAL. For a typical user, the root is the same as their login identifier. The instance is optional. All principals in a realm have their own key, which may derived from their password or randomly set of services. During enrollment, the KDC 112 provisions a Kerberos keytab to every host enrolled with the identity management system 110. The Kerberos keytab is a file that includes an unencrypted list of principals and their respective keys. The clients (e.g., host servers that provide services to one or more clients over the network) can retrieve the keys they need from the keytab file instead of using kinit.

In one embodiment, in response to input from the administrator 103, the KDC 112 creates a host principal for the client agent 104 in the Kerberos database, i.e., LDAP directory, using a password, such as a one-time password. For example, the client agent 104 can send a request to add a host principal for the client 102 on the KDC 112. The instance in this case may be the hostname of the client 102. Since this password for this principal will not be used again, the client agent 104 can use the -randkey option with the addprinc command to create the principal and assign it a random key (e.g., e.g., addprinc -randkey host/blah.example.com). Also, in response to input from the administrator 103, the KDS 112 also creates a service principal, such as a Hypertext Transfer Protocol (HTTP) service principal for the service provided by the host, i.e., client 102. The administrator 103 can also configure the KDC 112 to allow the host to manage a user certificate attribute of the HTTP service principal, and allow the host to manage certificates, such as request certificates, revoke certificates, etc.

It should be noted that additional details regarding Kerberos authentication has not been provided as such information would be appreciated by one of ordinary skill in the art having the benefit of this disclosure. Also, the embodiments described herein may be used in the context of other authentication protocols that use symmetric-key cryptography, instead of Kerberos specifically.

Figure 2C:
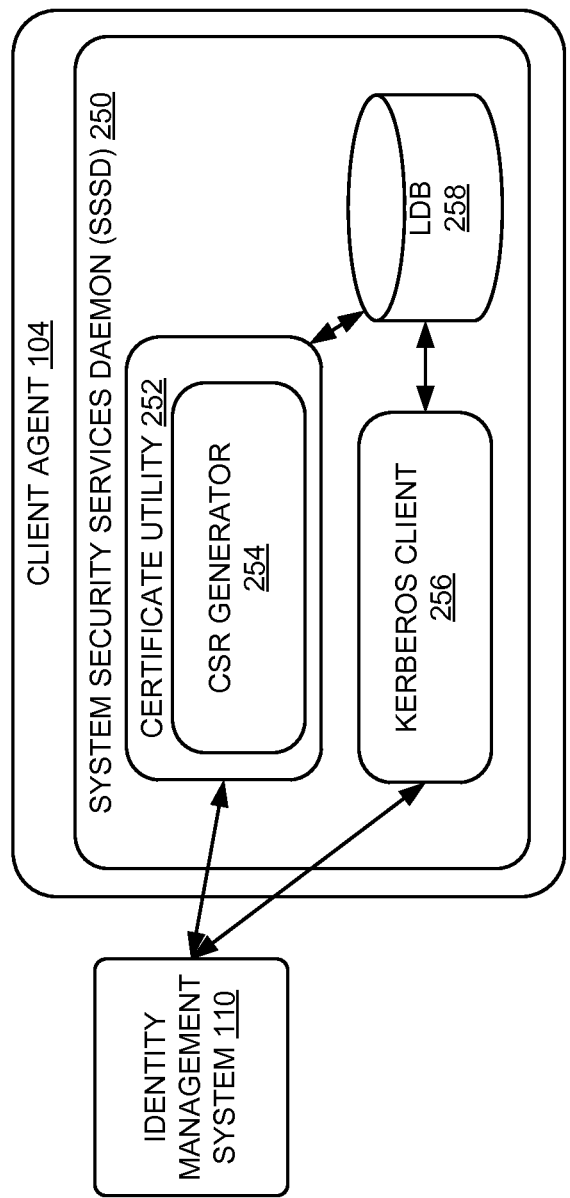
FIG. 2C is a block diagram of one embodiment of the client agent of FIG. 1.

FIG. 2C is a block diagram of one embodiment of the client agent 104 of FIG. 1. The client agent 104 includes a daemon called the Systems Security Services Daemon (SSSD) 250. The SSSD 250 is a collection of different services and daemons running in the system context. These services handle a variety of authentication and authorization functions, such as the certificate utility 252 and the Kerberos client 256. In particular, the Kerberos client 256 is responsible for handling establishing the secure connection using the Kerberos authentication, described above with respect to FIG. 2B from the client side, such as requesting authentication from the KDC 112, sending and receiving the TGT, retrieving the keytab file, etc. The certificate utility 252 can have various modules, for example, a utility to accept command line parameters and store them in the local database (LDB) 258, which may be a memory-mapped LDAP directory. The certificate utility 252 can also have an XML-RPC client that is an event-based daemon that periodically wakes up to see if it needs to perform any certificate operations. The XML-RPC client establishing a connection for requesting certificate operations. The XML-RPC client can also determines if the certificate is already provisioned into the LDAP entry and pulls the certificate from the LDAP entry or performs other checks as necessary. The XML-RPC client automatically generates a request to perform the certificate operation and sends the request to the identity management system 110 over the secure connection. In one embodiment, the XML-RPC client interacts directly with the LDB 258. In another embodiment, the XML-RPC client interacts with a data provider that determines if there are any certificate operations that need to be performed, determines online status of the client 102, and interacts with the data stored in the LDAP directory.

In one embodiment, the certificate utility 252 includes a CSR generator 254 to generate the CSR to request a new certificate, such as the CSR 201 described above with respect to FIG. 2A. In one embodiment, the CSR generator 254 generates a message to include information to identify the owner of the certificate (e.g., distinguished name) and a public key. The CSR generator 254 digitally signs the message using a private key corresponding to the public key. The digitally signed message is the CSR. A key pair, including the public and private keys, may be previously generated by the CSR generator 254 or some other module on the client computing system.

The CSR may be a base-64 encoded PKCS#10 request, such as provided in the following example:

```
-----BEGIN CERTIFICATE REQUEST-----
MIIBnTCCAQYCAQAwXTELMAkGA1UEBhMCU0cxETAPBgNVBAoTCE0yQ3J5c
HRvMRIwEAYDVQQDEw1sb2NhbGhvc3QxJzAlBgkqhkiG9w0BCQEWGGFkbW1uQ
HNlcnZlci5l
. . .
. . .
9rsQkRc9Urv9mRBIsredGnYECNeRaK5RlyzpOowninXc
- - -END CERTIFICATE REQUEST-----
```

In one embodiment, the CSR generator 254 generates a CSR using OpenSSL run, such as provided in the following example:

```
% certutil –N –d /tmp/test
% certutil –R –s "CN=ipa.example.com" –d /tmp/test –o test.csr –g 1024 –a
```

The CSR generator 254 prompts for the contents of the certificate subject (country, state, organization, etc), including a common name that needs to be set to the fully qualified domain name (FQDN) of the host. The CSR is in the file host.csr and the key for this request is in privkey.pem. When using network security services (NSS), the CSR generator 254 may start with a certificate database, and the NSS CSR generation may look like the following example:

```
% certutil –N –d /tmp/test
% certutil –R –s "CN=ipa.example.com" –d /tmp/test –o test.csr –g 1024 –a
```

The certificate utility 252 may pass the CSR, generated by the CSR generator 254, as one single string on the command line, as provided in the following example.

In another embodiment, the certificate utility 252 can generate the CSR using a single command line, such as provided in the following example:

Ipa cert-request file://test.csr -- principal=ldap3/zeus.example.com -- add

When requesting a certificate, a number of things happen: 1) the identity management system 110 checks the ACI "request certificate" to see if the requestor has permission to request certificates; 2) the subject of the certificate is compared to the hostname in the requested principal, since these must match; 3) the requested service record is retrieved, and if the service already has a userCertificate attribute then the request stops; 4) if the service does not exists and the --add argument was not provided then the request stops; 5) if the --add option was requested and the requestor does not have permission to add services, the request stops; and 6) the requestor must be listed in the managedBy attribute of the service record. As described herein, the managedBy attribute is a multi-value attribute that contains the distinguished name of all hosts that are allowed to write the userCertificate attribute of this service. The service-add-host and service-remove-host can be used to control access.

Alternatively, the certificate utility 252 can be configured to request other certificate operations, such as illustrated in the following examples:

Put a certificate on hold:
$ ipa cert-revoke -- revocation-reason=6 0xb
Remove a certificate from hold:
$ ipa cert-revoke -- revocation-reason=6 0xb
Revoke a certificate:
$ ipa cert-revoke -- revocation-reason=1 0xb
revoked: True
status: 0
Retrieve a revoked certificate:
$ ipa cert-get 0xb
certificate: MIIC7D . . .
revocation_reason: 1
status: 0

```
$ ipa cert-request --principal=1dap2/zeus.example.com --add
'MIIBejCB5AIBADA7MQwwCgYDVQQKEwNJUEExEDAOBgNVBAsTB3BraS1pcGExGTA
XBgNVBAMTEHp1dXMuZ3JleW9hay5jb20wgZ8wDQYJKoZIhvcNAQEBBQADgY0AMIG
/om52BCTSrOq+O+EhTdqLs+hUmUFRDpzmGX3x3UU0JR7cPcvNbcnNQvqfb2NAgMBAAG
gADANBgkq >
hkiG9w0BAQUFAAOBgQAjWFSgv3KZbcjn8V3rhAnuXG9xFzsqD5XsDRBsIMIrG/KNtw4VZ
BzuXlU2zOdoYm1vlSlzwep9xWXJi5L8HejyqPiCf2mLB60ZxBJLbe1UQ07+oCBMrxck4V
/3A5UC6jbtrqJ6t5mp3yiwkjEzEJGp3A=='
certificate:
MIIC7DCCAdSgAwIBAgIBCzANBgkqhkiG9w0BAQUFADAuMQwwCgYDVQQKEwNJUEE
xHjAcBgNVBAMTFUNlcnRpZmljYXRlIEF1dGhvcm10eTAeFwOw0TEwMDkxNTU5MzJa
/1Nb25vpWnM/Wu3N6F6hcYC722YjzAFFAFA6wJf4QybrUGQiihh4veqR1knZeoR8Wlc9491E+
IGwyk4SZxmSWMHc
/TEoTDKPqrngTaf3YsjzBqPhQQF6TkM1TL68uMsU4uHl7mWtD9ueDVQkWlWmTJEJXcT8O
dvIFOC
/Wb+Vq9FV11gJAosXmt8poZyHPGX+GiVxdtdZpoZSb7vyMg0FvjhSHNoX8tVo5QKlzxsci+xR
kT4tcAe+ReFyQ7+aX851QM1uttEUT1Gz1OxnfGojvHbiqYkH92fk+eURTZHGpK5H1U5gJ
/8SzU4awE= request_id: 11 serial_number: 0xb status: 0 subject:
CN=zeus.example.com,OU=pki-ipa,O=IPA </pre>
```

The following example demonstrates the steps taken by the administrator and the client 102 in order for the client 102 to request a certificate for itself. This assumes that the CSR has already been generated and is in the file web.csr in the current directory.

Administrator:

```
ipa host-add client.example.com - - password=secret123
ipa service-add HTTP/client.example.com
ipa service-add-host - - hosts=client.example.com
HTTP/client.example.com
ipa rolegroup-add-member - - hosts=client.example.com certadmin
```

Client:

```
ipa-client-install
ipa-join –w secret123
kinit –kt /etc/krb5.keytab host/client.example.com
ipa –d cert-request file://web.csr - - principal=HTTP/client.example.com
```

The previous example performs the following operations for the administrator actions: 1) adds a new host with a one-time password; 2) creates an HTTP service principal for the host principal; 3) allows the host to manage its own userCertificate attribute; and 4) allows the host to manage certificates (request, revoke, etc). The previous example performs the following operations for the client actions: 1) configures the client to use the realm of the identity management system 110; 2) joins the host to the realm and retrieves the keytab; 3) gets a Kerberos ticket for the client; 4) and requests a certificate.

In one embodiment, the LDB 258 contains an entry that contains information associated with the request for a new certificate. The entry may include the location of the CA (if more than one can be known to the client), server-supplied identifier for tracking the state of the request, date when the request was submitted, the format of the certificate, the path where the certificate is to be stored, whether the expiration should be tracked or not once the certificate issues, the format of the private key, and/or the path where the private key is stored. The LDB 258 may also contain an entry that contains information associated with expiration tracking information. This information may include the serial number retrieved from the issued certificate, the subject name retrieved from the issued certificate, the subject key identifier retrieved or calculated from the issued certificate, certificate expiration date retrieved from the issued certificate, the format of the private key, the path where the private key is stored, the format of the certificate, and/or the path where the certificate is to be stored.

Figure 3A:
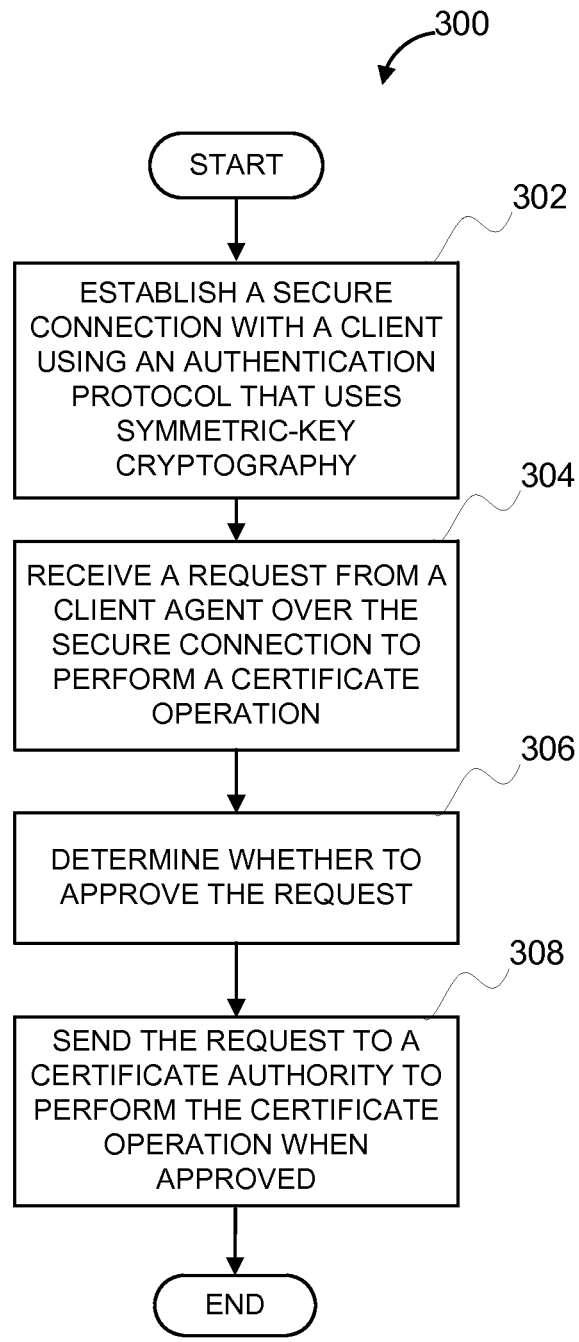
FIG. 3A is a flow diagram of one embodiment of a method of managing requests for certificate operations initiated by the client agent.

FIG. 3A is a flow diagram of one embodiment of a method of managing requests for certificate operations initiated by the client agent. The method 300 is performed by processing logic that may comprise hardware (circuitry, dedicated logic, etc.), software (such as is run on a general purpose computer system or a dedicated machine), firmware (embedded software), or any combination thereof. In one embodiment, the method 300 is performed by identity management system 110 of FIG. 1. In another embodiment, the certificate services manager 117 of FIGS. 1 (and/or) 2A and the KDC 112 of FIGS. 1 and 2B) performs the method 300. Alternatively, other components of the identity management system 110 may perform the method 300.

Referring to FIG. 3A, processing logic begins with establishing a secure connection with a client computing system using authentication protocol that uses symmetric-key cryptography (block 302). After establishing the secure connection, processing logic receives a request from a client agent of the client computing system over the secure connection to perform a certificate operation associated with a certificate (block 304). The client agent is capable of requesting the certificate operation without user intervention at the client computing system. Next, processing logic determines whether to approve the request from the client agent (block 306), and sends the request to a certificate authority (CA) to perform the certificate operation when approved (block 308), and the method ends. In this embodiment, since the request is received over the secure connection, the CA does not need to authenticate the request. By way of example and not limitation, the certificate operation may be include an operation to request a new certificate, to renew the certificate, to check a request status of the certificate, to retrieve the certificate, to put the certificate on hold, to remove the certificate from being on hold, and to revoke the certificate.

Figure 3B:
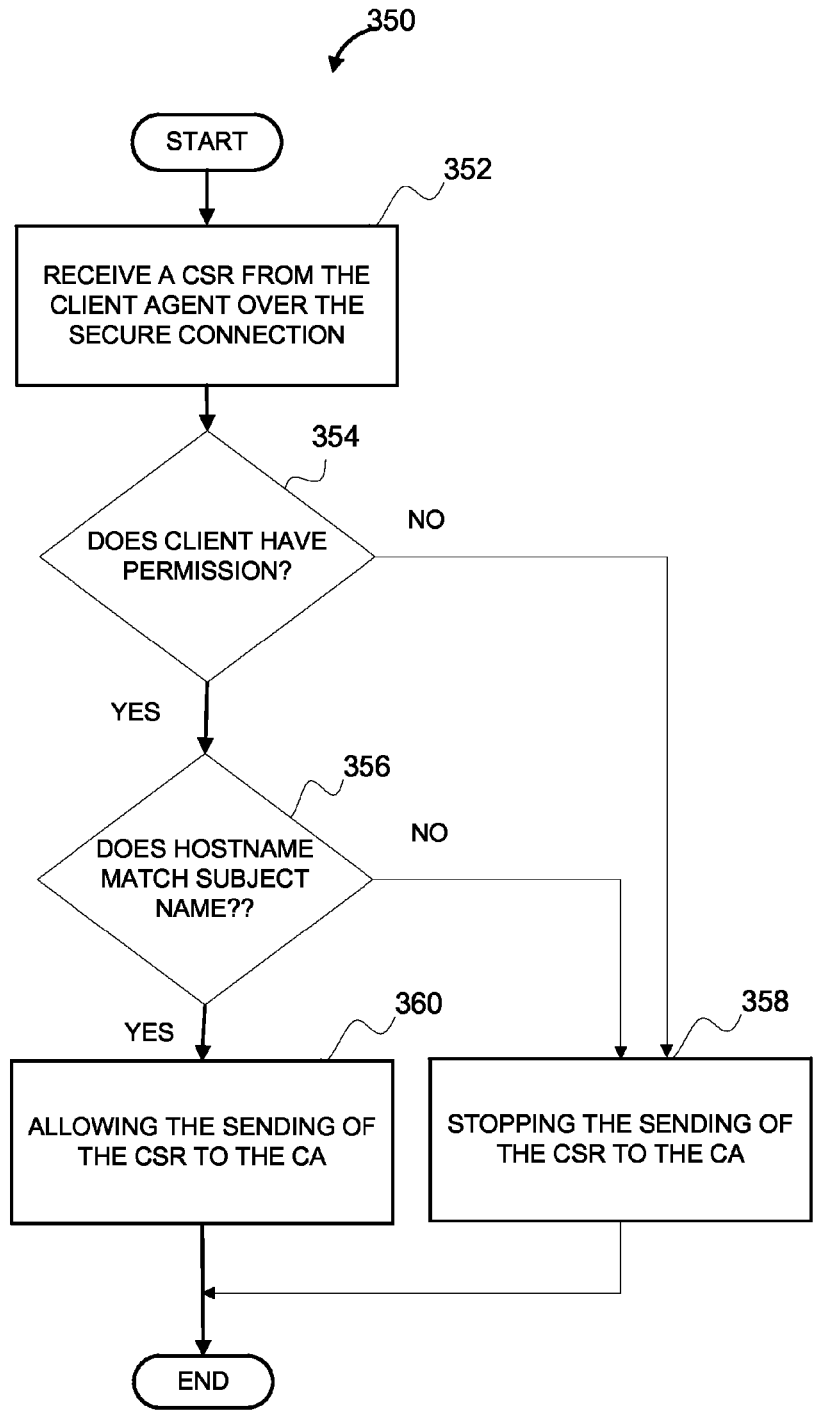
FIG. 3B is a flow diagram of one embodiment of a method of approving a certificate-signing request initiated by the client agent.

FIG. 3B is a flow diagram of one embodiment of a method 350 of approving a certificate-signing request (CSR) initiated by the client agent. The method 350 is performed by processing logic that may comprise hardware (circuitry, dedicated logic, etc.), software (such as is run on a general purpose computer system or a dedicated machine), firmware (embedded software), or any combination thereof. In one embodiment, the certificate services manager 117 of FIG. 1 or 2 performs the method 350. Alternatively, other components of the identity management system 110 may perform the method 350.

Referring to FIG. 3B, processing logic begins with receiving a CSR from the client agent over the secure connection (block 352), such as established at block 302 of FIG. 3A. The CSR contains information identifying an owner of the certificate and a public key and is digitally signed by a private key. Next, processing logic determines whether to approve the CSR by determining if the client computing system has permission to request certificates (block 354) and determining if a hostname of the client computing system matches a subject name of the certificate (block 356). The processing logic stops the sending of the CSR to the CA when the hostname and the subject name do not match or the client computing system does not have permission (block 358), and the processing logic allows the sending of the CSR to the CA when the host name and the subject name match and the client computing system has permission to request certificates (block 360), and the method ends. Alternatively, the method 350 can be modified to include other conditions that need to be satisfied to approve the CSR to be sent to the CA. Similarly, the method 350 can be modified to include fewer conditions than illustrated in FIG. 3B. In one embodiment, the processing logic determines if the client has permission at block 354 by checking an ACI that specifies whether the client has permission to request certificates.

In another embodiment, the processing logic can retrieve a service principal record associated with the client and determine if the service principal record already has a user certificate attribute. If the processing logic determines that the service principal record does not have the user certificate attribute, processing logic allows the CSR to be sent to the CA, otherwise the processing logic stops the request. In another embodiment, if the processing logic determines that the service principal record does not exist, the processing logic determines if an add argument is received in connection with the CSR. The add argument requests permission to modify the user certificate attribute. If the processing logic determines that the add argument was received and that the client has permission to modify the user certificate (e.g., listed in the service principal record as an administrator or listed in the managedBy attribute), the processing logic allows the CSR to be sent to the CA, otherwise the processing logic stops the request.

In another embodiment, the processing logic receives a request from the client to retrieve the certificate, such as a revoked certificate. The processing logic determines if the hostname and the subject name match, and determines if the client has permission to retrieve certificates. If the client has permission and the hostname and subject name match, the processing logic delivers the certificate to the client without user intervention at the client.

In another embodiment, the processing logic configures the host to use a Kerberos realm, and allows the host to join the realm and to retrieve a Kerberos keytab to allow the host to authenticate to the identity management system. The processing logic also sends a Kerberos ticket to the host so the client can establish the secure connection on which the processing logic receives the requests for the certificate operations.

Figure 3C:
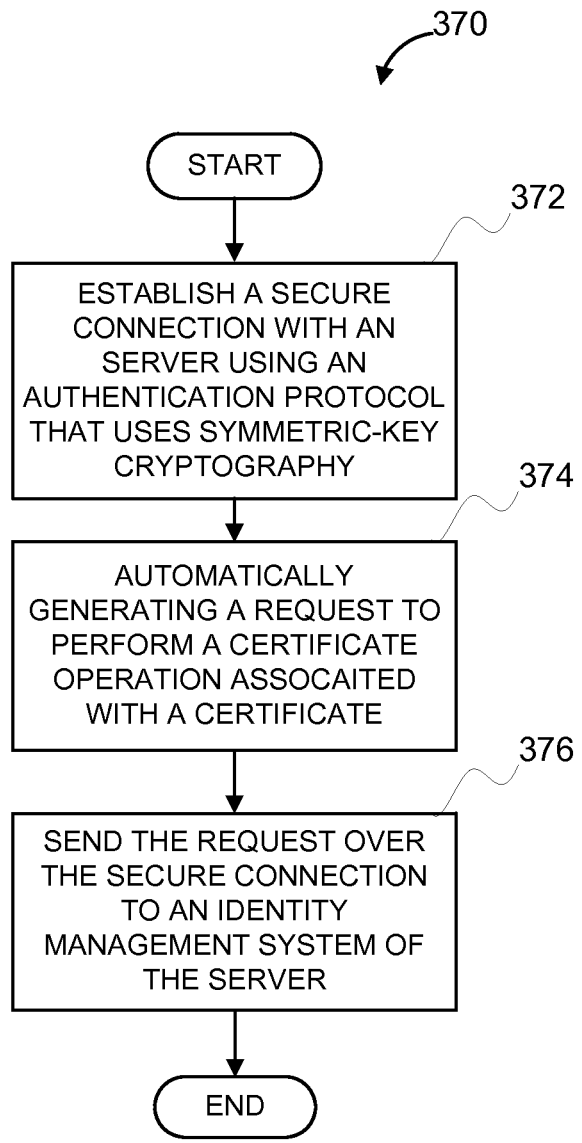
FIG. 3C is a flow diagram of one embodiment of a method of automatically generating a certificate operation request.

FIG. 3C is a flow diagram of one embodiment of a method of automatically generating a certificate operation request. The method 370 is performed by processing logic that may comprise hardware (circuitry, dedicated logic, etc.), software (such as is run on a general purpose computer system or a dedicated machine), firmware (embedded software), or any combination thereof. In one embodiment, the client workstation 102 of FIG. 1 performs the method 370. In another embodiment, the client agent 104 of FIGS. 1 and 2A-2C perform the method 370. Alternatively, other components of the client workstation 102 may perform the method 370.

Referring to FIG. 3C, processing logic begins with receiving establishing a secure connection with a server computing system using authentication protocol that uses symmetric-key cryptography (block 372). After establishing the secure connection, processing logic automatically generates a request to perform a certificate operation associated with a certificate (block 374) and sends the request over the secure connection to an identity management system of the server computing system (block 376). The processing logic performs the operations of block 374 and 376 without user intervention at the computing system. By way of example and not limitation, the certificate operation may be include an operation to request a new certificate, to renew the certificate, to check a request status of the certificate, to retrieve the certificate, to put the certificate on hold, to remove the certificate from being on hold, and to revoke the certificate.

Figure 4:
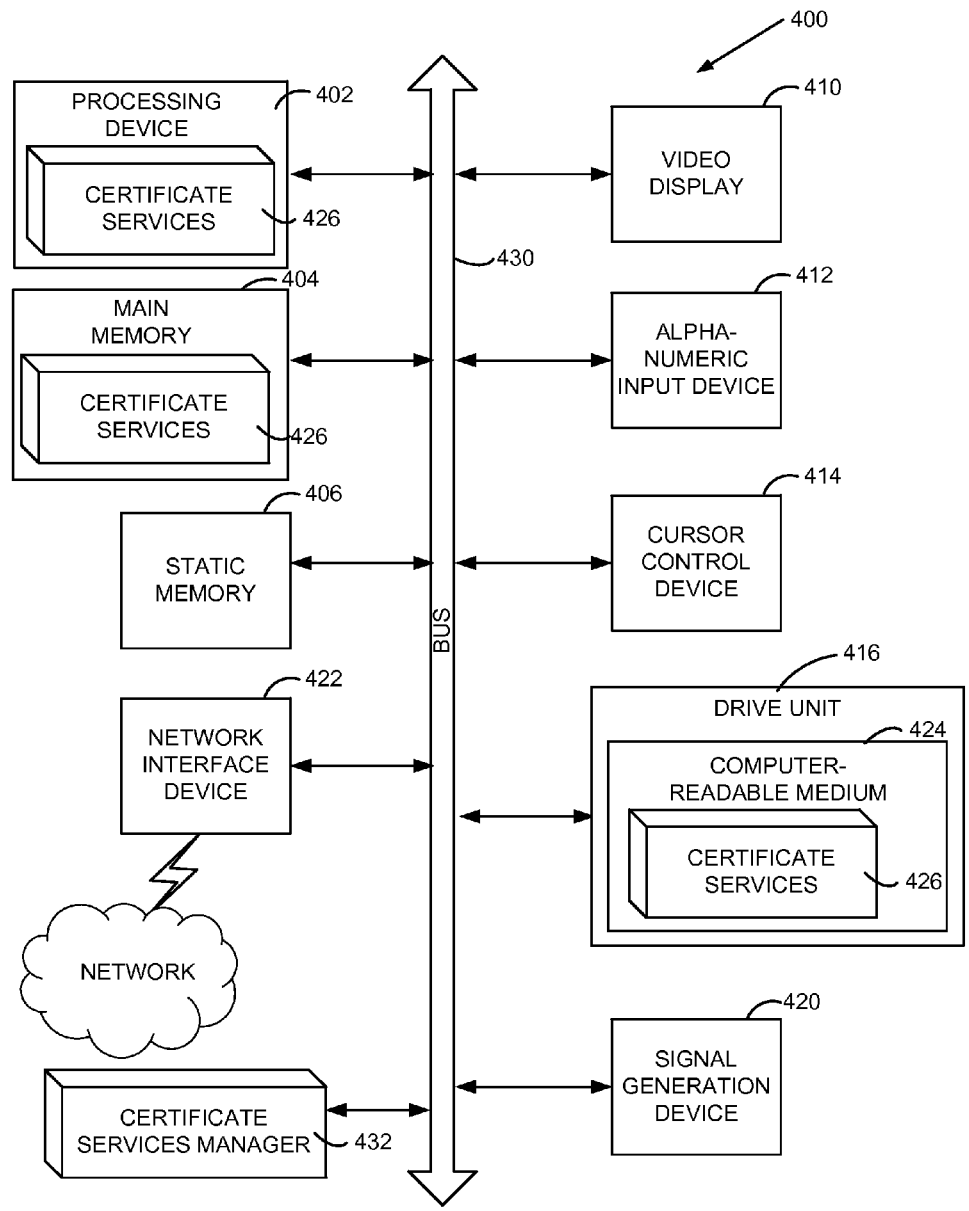
FIG. 4 illustrates a diagrammatic representation of a machine in the exemplary form of a computer system for identity management certificate operations.

FIG. 4 illustrates a diagrammatic representation of a machine in the exemplary form of a computer system 400 for identity management certificate operations. Within the computer system 400 is a set of instructions for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a STB, a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for certificate operations by the identity management system, such as the methods 300 and 350 described above. In one embodiment, the computer system 400 represents various components that may be implemented in the identity management system 110 as described above. Alternatively, the identity management system 110 may include more or less components as illustrated in the computer system 400.

The exemplary computer system 400 includes a processing device 402, a main memory 404 (e.g., read-only memory (ROM), flash memory, dynamic random access memory (DRAM) such as synchronous DRAM (SDRAM) or DRAM (RDRAM), etc.), a static memory 406 (e.g., flash memory, static random access memory (SRAM), etc.), and a data storage device 416, each of which communicate with each other via a bus 430.

Processing device 402 represents one or more general-purpose processing devices such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic (e.g., certificate services 426) for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored one or more sets of instructions (e.g., certificate services 426) embodying any one or more of the methodologies or functions described herein. The certificate services 426 may also reside, completely or at least partially, within the main memory 404 and/or within the processing device 402 during execution thereof by the computer system 400, the main memory 404 and the processing device 402 also constituting computer-readable storage media. The certificate services 426 may further be transmitted or received over a network via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The certificate services manager 432, components, and other features described herein (for example in relation to FIGS. 1 and 2A) can be implemented as discrete hardware components or integrated in the functionality of hardware components such as ASICS, FPGAs, DSPs or similar devices. In addition, the certificate services manager 432 can be implemented as firmware or functional circuitry within hardware devices. Further, the certificate services manager 432 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
    establishing a secure connection between a client computing system and an identity management system for the client computing system using a Kerberos authentication protocol that uses symmetric-key cryptography;
    receiving, by a processing device in the identity management system, a request from the client computing system over the secure connection to perform a certificate operation associated with a certificate, wherein the certificate operation comprises at least one of requesting issuance of the certificate, renewing the certificate, checking a request status of the certificate, retrieving the certificate from a certificate authority (CA) system, putting the certificate on hold, removing the certificate from being on hold, or revoking the certificate;
    determining to approve the request from the client computing system;
    sending, by a registration authority (RA) at the identity management system, a proxy of the request to the CA system to perform the certificate operation in response to determining to approve the request, wherein the RA is a trusted manager of the CA system and uses the authentication of the secure connection between the identity management system and the client computing system to send the proxy of the request to the CA system which performs the certificate operation without authenticating the request; and
    receiving, by the RA, a reply from the CA system in response to sending the proxy of the request to perform the certificate operation to the CA system and sending the reply to the client computing system without user intervention at the client computing system.

2. The method of claim 1, wherein the client computing system comprises a service provider that provides a service to one or more clients over a network.

3. The method of claim 1, wherein the certificate operation comprises requesting issuance of the certificate, wherein receiving the request comprises receiving a certificate signing request (CSR) from the client computing system, wherein the CSR comprises information identifying an owner of the certificate and a public key, and wherein determining to approve the request comprises:
    determining if the client computing system has permission to request issuance of certificates;
    determining if a hostname of the client computing system matches a subject name of the certificate;
    stopping the sending of the CSR to the CA system when the hostname and the subject name do not match or the client computing system does not have permission to request issuance of certificates; and
    allowing the sending of the CSR to the CA system to approve and issue the certificate when the hostname and the subject name match and the client computing system has permission to request issuance of certificates, wherein the CSR is not authenticated by the CA system.

4. The method of claim 3, wherein determining if the client computing system has permission to request issuance of certificates comprises checking an access control instruction (ACI) that specifies whether the client computing system has permission to request issuance of certificates.

5. The method of claim 1, wherein the certificate operation comprises requesting issuance of the certificate, wherein receiving the request comprises receiving a certificate signing request (CSR) from the client computing system, wherein the CSR comprises information identifying an owner of the certificate and a public key, and wherein determining to approve the request comprises:
    retrieving a service principle record associated with the client computing system;
    determining if the service principle record already has a user certificate attribute;
    stopping the sending of the CSR to the CA system when the service record already has the user certificate attribute; and
    allowing the sending of the CSR to the CA system to approve and issue the certificate when the service principle record does not already have the user certificate attribute, wherein the CSR is not authenticated by the CA system.

6. The method of claim 5, further comprising:
    determining that the service principle record associated with the CSR does not exist;
    in response to determining that the service principle record does not exist, determining if an add argument is received in connection with the CSR, wherein the add argument requests permission to modify the user certificate attribute;
    determining if the client computing system has permission to modify the user certificate attribute, wherein the client computing system has permission to modify the user certificate attribute when the client computing system is listed in the service principal record;
    stopping the sending of the CSR to the CA system when the add argument is not received in connection with the CSR or when the client computing system does not have permissions to modify the user certificate attribute; and
    allowing the sending of the CSR to the CA system when the add argument is received in connection with the CSR and the client computing system has permission to modify the user certificate attribute, wherein the CSR is not authenticated by the CA system.

7. The method of claim 1, wherein the certificate operation comprises retrieving the certificate from the CA system, wherein the request identifies the certificate to be retrieved, and wherein determining to approve the request comprises:
    determining that a hostname of the client computing system matches a subject name of the certificate, and
    wherein sending the reply comprises delivering the certificate to the client computing system in response to determining that the hostname and the subject name match, wherein delivering the certificate comprises delivering the certificate to the client computing system without user intervention at the client computing system.

8. The method of claim 1, wherein the certificate operation comprises retrieving the certificate from the CA system, wherein the request identifies the certificate to be retrieved, and wherein determining to approve the request comprises:
determining that the client computing system has permission to retrieve the certificate from the CA system; and
determining that a hostname of the client computing system matches a subject name of the certificate, and
wherein sending the reply comprises delivering the certificate to the client computing system in response to determining that the hostname and the subject name match and that the client computing system has permission to retrieve the certificate from the CA system, wherein delivering the certificate comprises delivering the certificate to the client computing system without user intervention at the client computing system.

9. The method of claim 1, further comprising:
creating a host principal for the client computing system using a password;
creating a Hypertext Transfer Protocol (HTTP) service principal for the host principal;
allowing the host principal to manage a user certificate attribute of the HTTP service principal; and
allowing the host principal to manage certificates, comprising allowing the host principal to request the certificate operation.

10. The method of claim 9, further comprising:
configuring the host principal to use a Kerberos realm of the identity management system;
allowing the host principal to join the Kerberos realm and retrieve a Kerberos keytab to allow the host principal to authenticate to the identity management system, wherein the Kerberos keytab comprises a file that comprises an unencrypted list of principals of the Kerberos realm and their corresponding keys; and
sending a Kerberos ticket to the host principal for the client computing system to establish the secure connection for receiving the request to perform the certificate operation.

11. A system comprising:
one or more processing devices, in an identity management system for a client computing system, to:
establish a secure connection between the client computing system and the identity management system using a Kerberos authentication protocol that uses symmetric-key cryptography;
receive a request from the client computing system over the secure connection to perform a certificate operation associated with a certificate, wherein the certificate operation comprises at least one of requesting issuance of the certificate, renewing the certificate, checking a request status of the certificate, retrieving the certificate from a certificate authority (CA) system, putting the certificate on hold, removing the certificate from being on hold, or revoking the certificate;
determine to approve the request from the client computing system;
send, by a registration authority (RA) at the identity management system, a proxy of the request to the CA system to perform the certificate operation in response to the determination to approve the request, wherein the RA is a trusted manager of the CA system and uses the authentication of the secure connection between the identity management system and the client computing system to send the proxy of the request to the CA system which is to perform the certificate operation without authentication of the request; and
receive, by the RA, a reply from the CA system in response to the delivery of the proxy of the request to perform the certificate operation to the CA system and send the reply to the client computing system without user intervention at the client computing system.

12. The system of claim 11, wherein the certificate operation comprises requesting issuance of the certificate, wherein to receive the request the one or more processing devices are to receive a certificate signing request (CSR) from the client computing system, wherein the CSR comprises information identifying an owner of the certificate and a public key, and wherein the CSR is digitally signed by a private key.

13. The system of claim 12, further comprising a directory server coupled to a data storage device, wherein the data storage device is to store a service principal record associated with the client computing system, and wherein the one or more processing devices are to retrieve the service principal record via the directory server to determine to approve the request.

14. The system of claim 11, further comprising a certificate services manager to receive a certificate signing request (CSR) from the client computing system, wherein the CSR comprises information identifying an owner of the certificate and a public key, and wherein the certificate services manager comprises:
a user authorization module to determine that the client computing system has permission to request issuance of certificates; and
a certificate request authorization module to determine that a hostname of the client computing system matches a subject name of the certificate, and wherein the certificate services manager is to send the CSR to the CA system to approve and issue the certificate in response to the determination that the hostname and the subject name match and that the client computing system has permission to request issuance of certificates, wherein the CSR is not authenticated by the CA system.

15. The system of claim 11, further comprising:
a network time protocol (NTP) server to synchronize clocks of the identity management system and the client computing system; and
a domain name system (DNS) server to resolve a machine name of the client computing system or to inversely resolve a network address of the client computing system.

16. A non-transitory machine-readable storage medium having instructions that, when executed by a processing device, cause the processing device to:
establish a secure connection between a client computing system and an identity management system for the client computing system using a Kerberos authentication protocol that uses symmetric-key cryptography;
receive, by the processing device in the identity management system, a request from the client computing system over the secure connection to perform a certificate operation associated with a certificate, wherein the certificate operation comprises at least one of requesting issuance of the certificate, renewing the certificate, checking a request status of the certificate, retrieving the certificate from a certificate authority (CA) system, putting the certificate on hold, removing the certificate from being on hold, or revoking the certificate;

determine to approve the request from the client computing system;

send, by a registration authority (RA) at the identity management system, a proxy of the request to the CA system to perform the certificate operation in response to the determination to approve the request, wherein the RA is a trusted manager of the CA system and uses the authentication of the secure connection between the identity management system and the client computing system to send the proxy of the request to the CA system which is to perform the certificate operation without authentication of the request; and receive, by the RA, a reply from the CA system in response to the delivery of the proxy of the request to perform the certificate operation to the CA system and send the reply to the client computing system without user intervention at the client computing system.

17. The non-transitory machine-readable storage medium of claim 16, wherein the certificate operation comprises requesting issuance of the certificate, wherein to receive the request the processing device is to receive a certificate signing request (CSR) from the client computing system, wherein the CSR comprises information identifying an owner of the certificate and a public key, and wherein to determine to approve the request the processing device is to:

determine that the client computing system has permission to request issuance of certificates;

determine that a hostname of the client computing system matches a subject name of the certificate, and wherein to send the request the processing device is to send the CSR to the CA system to approve and issue the certificate in response to the determination that the hostname and the subject name match and that the client computing system has permission to request issuance of certificates, wherein the CSR is not authenticated by the CA system.

18. The non-transitory machine-readable storage medium of claim 16, wherein the processing device is further to:

configure a host principal for the client computing system to use a Kerberos realm of the identity management system;

allow the host principal to join the Kerberos realm and retrieve a Kerberos keytab to allow the host principal to authenticate to the identity management system, wherein the Kerberos keytab comprises a file that comprises an unencrypted list of principals of the Kerberos realm and their corresponding keys; and send a Kerberos ticket to the host principal for the client computing system to establish the secure connection to receive the request to perform the certificate operation.

* * * * *